(12) United States Patent
Miyama et al.

(10) Patent No.: US 8,866,353 B2
(45) Date of Patent: Oct. 21, 2014

(54) INVERTER-INTEGRATED DRIVING MODULE

(75) Inventors: Yoshihiro Miyama, Tokyo (JP); Moriyuki Hazeyama, Tokyo (JP); Masaya Inoue, Tokyo (JP); Yoshiko Obiraki, Tokyo (JP); Tatsuya Kitamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 315 days.

(21) Appl. No.: 13/519,332

(22) PCT Filed: Jan. 20, 2011

(86) PCT No.: PCT/JP2011/050941
§ 371 (c)(1),
(2), (4) Date: Jun. 27, 2012

(87) PCT Pub. No.: WO2011/093200
PCT Pub. Date: Aug. 4, 2011

(65) Prior Publication Data
US 2012/0299407 A1    Nov. 29, 2012

(30) Foreign Application Priority Data

Jan. 29, 2010 (JP) .................................. 2010-018096

(51) Int. Cl.
H02K 9/06 (2006.01)
H02K 9/10 (2006.01)
H02K 9/22 (2006.01)
H02K 11/00 (2006.01)
H02K 5/18 (2006.01)
H02K 5/20 (2006.01)
H02K 1/27 (2006.01)
H02K 1/32 (2006.01)

(52) U.S. Cl.
CPC .. *H02K 5/18* (2013.01); *H02K 5/20* (2013.01); *H02K 11/0073* (2013.01); *H02K 1/2786* (2013.01); *H02K 1/32* (2013.01); *H02K 9/06* (2013.01)

USPC .................. 310/64; 310/58; 310/59; 310/62; 310/68 D

(58) Field of Classification Search
CPC .. H02K 9/02; H02K 11/0073; H02K 11/0094
USPC .............................. 310/52, 58, 59, 62, 63, 64
See application file for complete search history.

(56) References Cited

U.S. PATENT DOCUMENTS 6,184,600 B1 * 2/2001 Asao et al. ...................... 310/64
7,196,439 B2 * 3/2007 Pierret et al. .................... 310/58
(Continued)

FOREIGN PATENT DOCUMENTS

JP   2002 262517   9/2002
JP   2007 116840   5/2007
(Continued)

OTHER PUBLICATIONS

International Search Report Issued Feb. 15, 2011 in PCT/JP11/50941 Filed Jan. 20, 2011.

*Primary Examiner* — Quyen Leung
*Assistant Examiner* — Thomas Truong
(74) *Attorney, Agent, or Firm* — Oblon, Spivak, McClelland, Maier & Neustadt, L.L.P.

(57) ABSTRACT

A first inverter ventilation aperture is disposed so as to pass through a portion of a fin base that faces a bearing, a first rotor ventilation aperture is disposed so as to pass through a portion of a bottom surface portion that faces the bearing, and a first cooling airflow ventilation channel is formed in which a cooling airflow flows radially inward through radiating fins, then flows toward a first surface side of a mount portion through the first inverter ventilation aperture, flows axially through an interior portion of a stator core, and then flows out between the bottom surface portion and a base portion through the first rotor ventilation aperture, and subsequently flows radially outward between the bottom surface portion and the base portion due to rotational driving of a centrifugal fan.

12 Claims, 11 Drawing Sheets

(56) References Cited

U.S. PATENT DOCUMENTS

| | | |
|---|---|---|
| 2002/0109426 A1 | 8/2002 | Peter et al. |
| 2007/0103101 A1 | 5/2007 | Kikuchi et al. |
| 2009/0230791 A1* | 9/2009 | Scharfenberg et al. ......... 310/62 |
| 2010/0289352 A1* | 11/2010 | Takechi et al. ................. 310/64 |

FOREIGN PATENT DOCUMENTS

| | | |
|---|---|---|
| JP | 4123436 | 7/2008 |
| JP | 2009 291040 | 12/2009 |
| WO | 2006 008897 | 1/2006 |

\* cited by examiner

INVERTER-INTEGRATED DRIVING MODULE

TECHNICAL FIELD

The present invention relates to a driving module in which an inverter is internally mounted, and particularly relates to a cooling construction for a bearing, an inverter module, etc.

BACKGROUND ART

Conventional inverter-integrated alternating-current (AC) motors include: an AC motor that is fixed to a rotating shaft, and that has a cooling fan to suck a cooling airflow in through a first end wall of a motor housing; a controlling apparatus that is fixed to the motor housing so as to be positioned axially outside the first end wall of the motor housing; a cover that is mounted to the motor housing so as to cover the controlling apparatus; and brushes for passing field current to a rotor of the AC motor (see Patent Literature 1, for example).

CITATION LIST

Patent Literature

Patent Literature 1: Japanese Patent No. 4123436 (Gazette)

SUMMARY OF THE INVENTION

Problem to be Solved by the Invention

Because conventional inverter-integrated AC motors use inner rotors, the amount of magnetic flux that is generated in the rotor cannot be increased due to constraints on the construction of the rotor, and torque per unit length cannot be increased. Specifically, if the outside diameter of the motor is kept constant, the surface area of an inner rotor that faces the stator is reduced compared to an outer rotor, reducing the amount of magnetic flux that is generated compared to the outer rotor.

Thus, it is preferable to use an outer rotor in order to increase torque per unit length. If an outer rotor is used, because the diameter of the rotor is increased and the weight of the rotor is heavier in comparison to an inner rotor, the burden on a bearing that rotatably supports the rotor is increased, increasing the amount of heat generated in the bearing. However, since the inverter is mounted internally, cooling of the bearing may be insufficient because the inflow channel for the cooling airflow into the motor is limited, giving rise to new problems such as service life of the bearing being shortened.

The present invention aims to solve the above problems and an object of the present invention is to provide an inverter-integrated driving module that can cool an inverter module and a bearing effectively by enabling the bearing to be cooled by a cooling airflow that has cooled the inverter module.

Means for Solving the Problem

An inverter-integrated driving module according to the present invention includes: a motor including: a stator including: an annular stator core in which slot portions are arranged in a row circumferentially so as to have openings on an outer circumferential side; and a stator coil that is mounted onto the stator core; a bearing box that is held by the stator core at a central axial position of the stator core by means of radial ribs; a rotor including: a cylindrical rotor yoke portion; a bottom surface portion that is disposed so as to extend radially inward from a first end of the rotor yoke portion; and a plurality of magnetic poles that are disposed on an inner circumferential surface of the rotor yoke portion such that North-seeking (N) poles and South-seeking (S) poles are arranged in a row so as to alternate circumferentially, wherein the bottom surface portion is fixed to a shaft that is supported by a bearing that is housed in the bearing box, and the rotor yoke portion is mounted so as to be coaxial with the stator so as to envelop the stator core; a fan that is disposed on a first axial end of the rotor so as to face the bottom surface portion so as to be able to rotate together with the rotor; and an inverter module including: a heatsink including: a tabular fin base; and a plurality of radiating fins that are each disposed so as to stand perpendicularly on a rear surface of the fin base so as to extend radially and that are arranged in a row circumferentially; and a plurality of inverter units that are each mounted so as to be positioned on a region of a front surface of the fin base that corresponds to where the radiating fins are disposed, the plurality of inverter units supplying alternating-current power to the stator coil. The motor is mounted to a bracket by fixing the stator core to a first surface of a tabular mount portion of the bracket, and the inverter module is mounted to the bracket such that the radiating fins face toward a second surface of the mount portion by fixing the fin base to the mount portion by means of a spacer. A first inverter ventilation aperture is disposed so as to pass through a portion of the bracket that faces the bearing, a first rotor ventilation aperture is disposed so as to pass through a portion of the bottom surface portion that faces the bearing, and a first cooling airflow ventilation channel is formed that includes: a radial ventilation channel that is formed between adjacent radiating fins so as to communicate between the first inverter ventilation aperture and a radially outer side of the heatsink, and through which a cooling airflow flows radially due to rotational driving of the fan; and an axial ventilation channel that is formed inside the stator core so as to communicate between the first inverter ventilation aperture and the first rotor ventilation aperture, and through which the cooling airflow flows axially.

Effects of the Invention

According to the present invention, the inverter units and the bearing are cooled by the cooling airflow that flows through the first cooling airflow ventilation channel. Thus, because excessive temperature increases in the inverter units and the bearing are suppressed even in an inverter-integrated driving module that uses an outer rotor, extension of service life of the inverter units and the bearing can be achieved.

DESCRIPTION OF EMBODIMENTS

Preferred embodiments of an inverter-integrated driving module according to the present invention will now be explained using the drawings.

Embodiment 1

Figure 1:
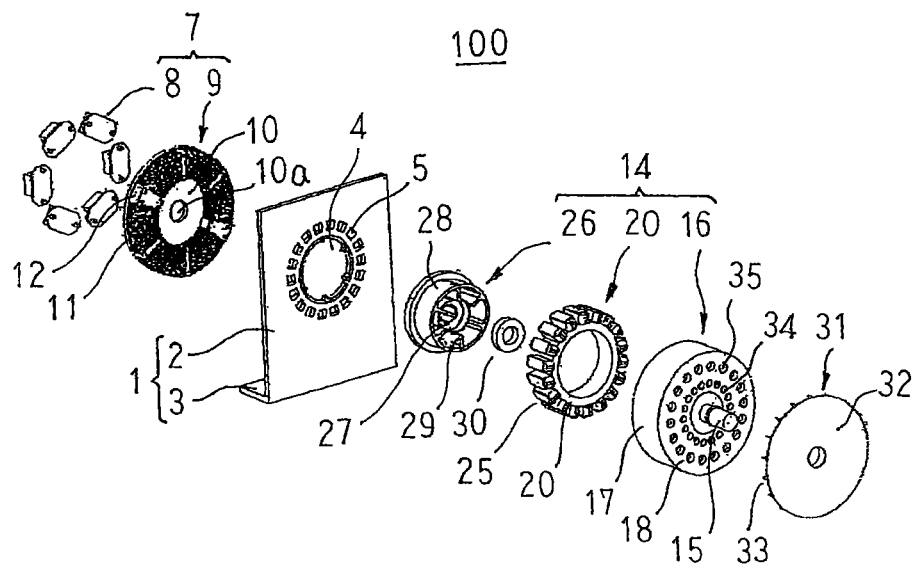
[FIG. 1] It is an exploded perspective that shows an inverter-integrated driving module according to Embodiment 1 of the present invention.
Figure 2:
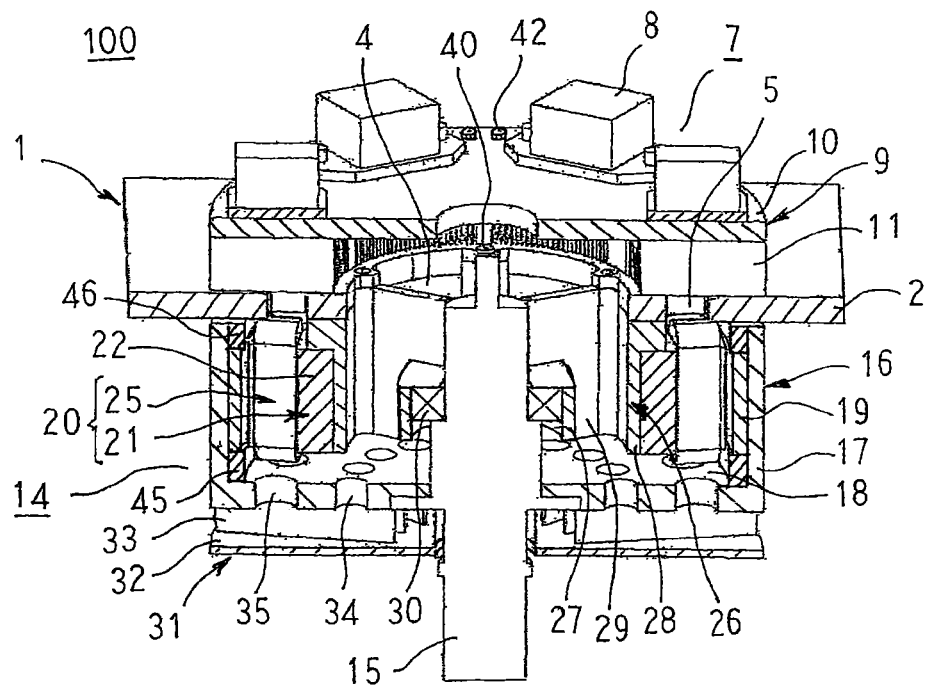
[FIG. 2] It is a cross-sectional perspective that shows the inverter-integrated driving module according to Embodiment 1 of the present invention.
Figure 3:
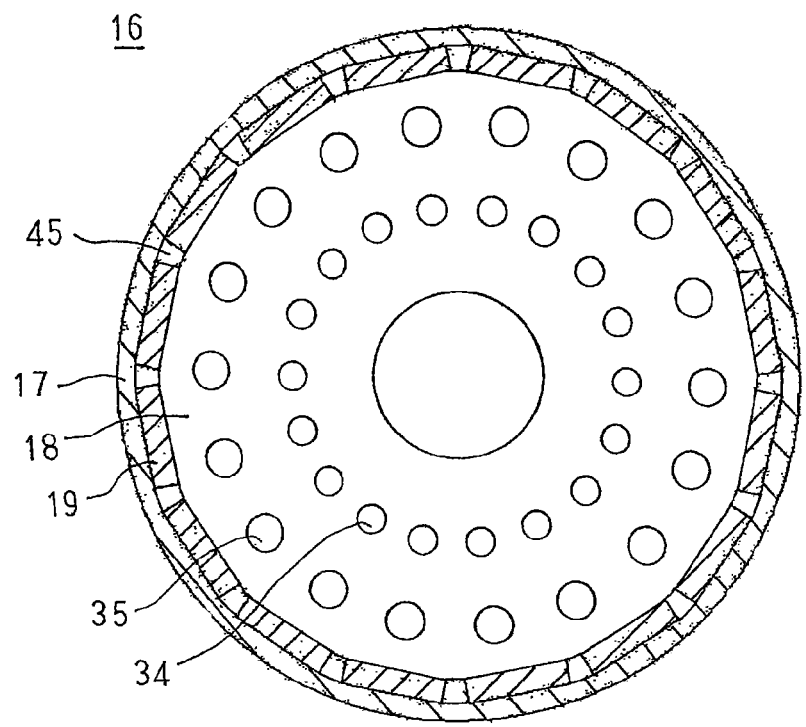
[FIG. 3] It is a cross section that shows a rotor that constitutes a motor that is used in the inverter-integrated driving module according to Embodiment 1 of the present invention.
Figure 4:
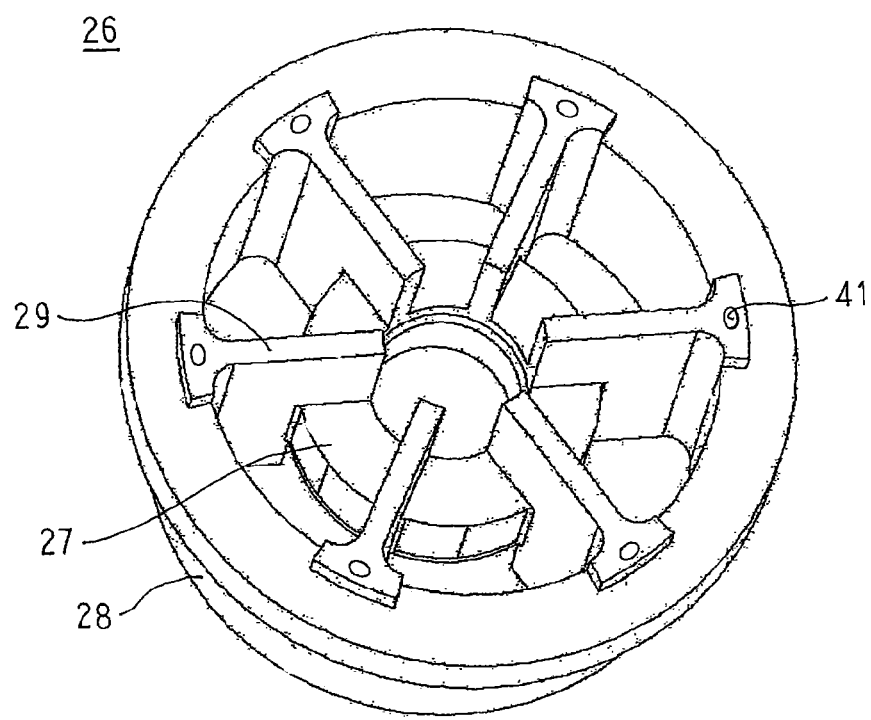
[FIG. 4] It is a perspective that shows a stator supporting member that constitutes a motor that is used in the inverter-integrated driving module according to Embodiment 1 of the present invention.
Figure 5:
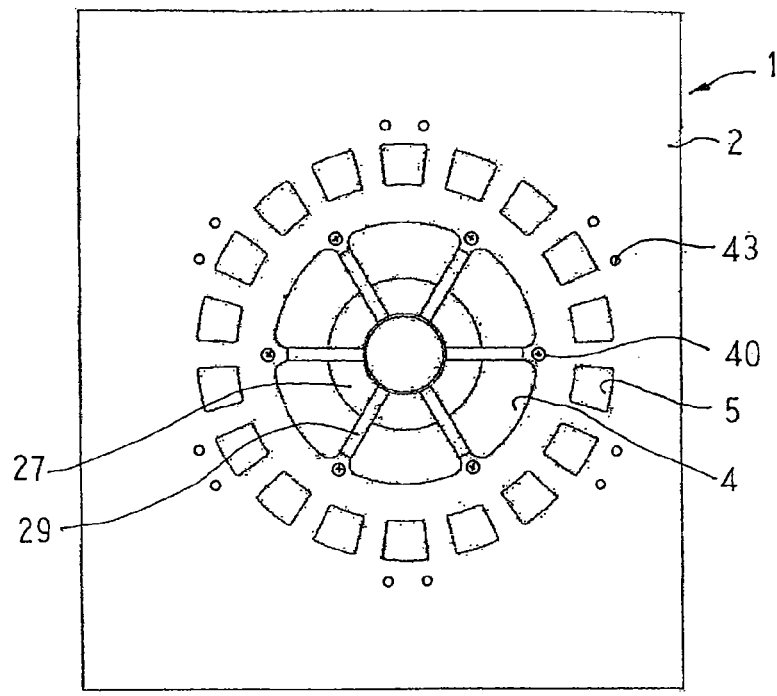
[FIG. 5] It is a front elevation of a state in which the stator supporting member of the inverter-integrated driving module according to Embodiment 1 of the present invention is mounted to a bracket viewed from a side near a first surface of the bracket.
Figure 6:
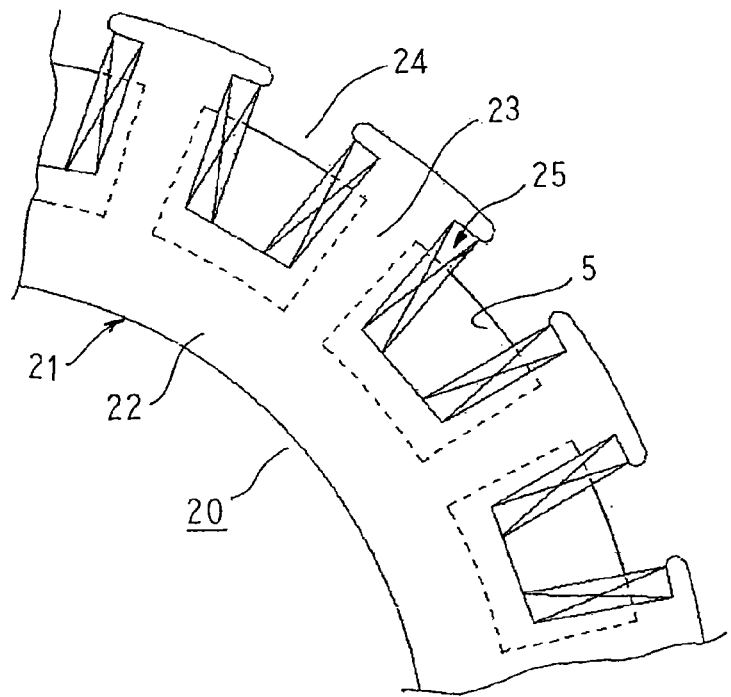
[FIG. 6] It is a diagram that explains a radial positional relationship between a stator and the bracket in the inverter-integrated driving module according to Embodiment 1 of the present invention.
Figure 7:
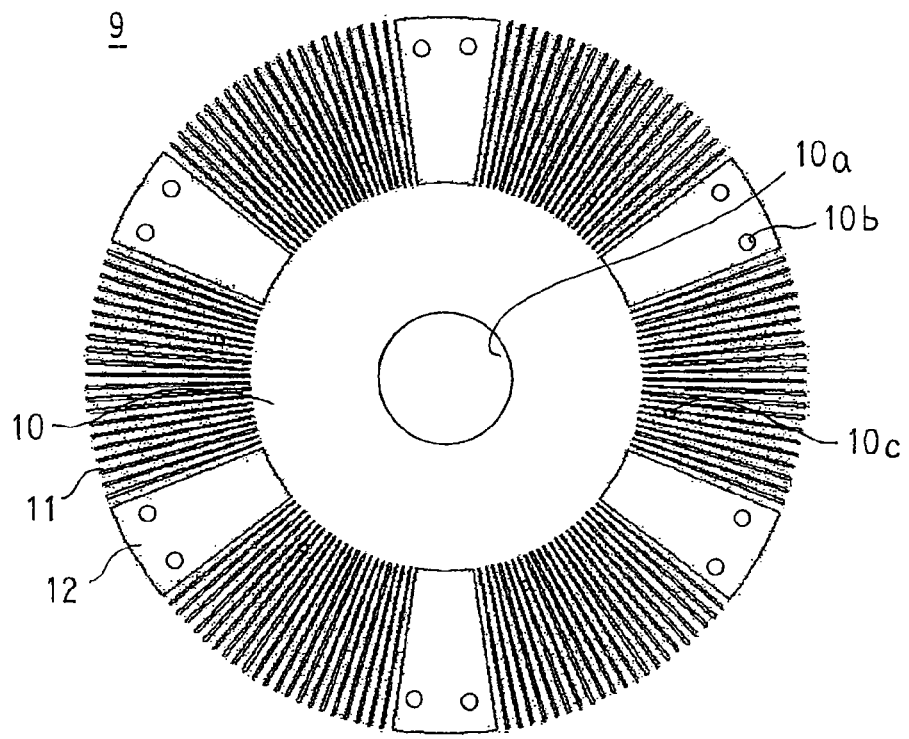
[FIG. 7] It is a rear elevation that shows a heatsink that constitutes an inverter module that is used in the inverter-integrated driving module according to Embodiment 1 of the present invention.
Figure 8:
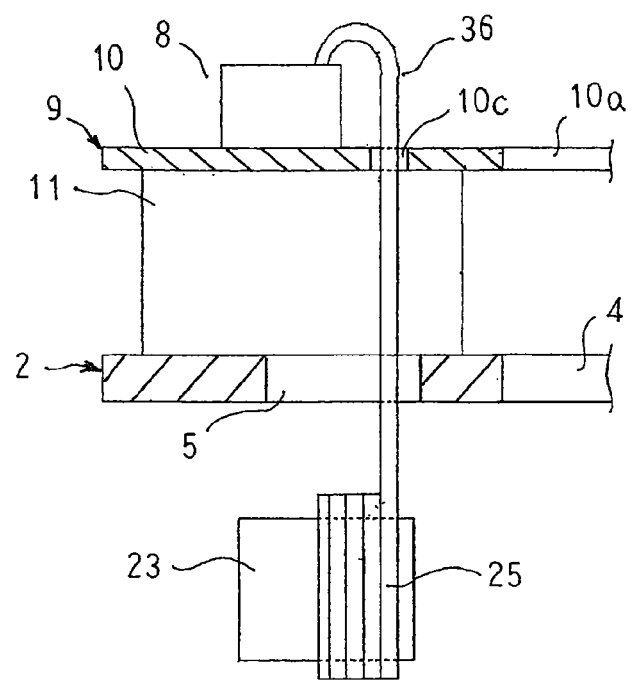
[FIG. 8] It is a partial cross section that explains an electrical connecting method between an inverter unit and a stator coil in the inverter-integrated driving module according to Embodiment 1 of the present invention.
Figure 9:
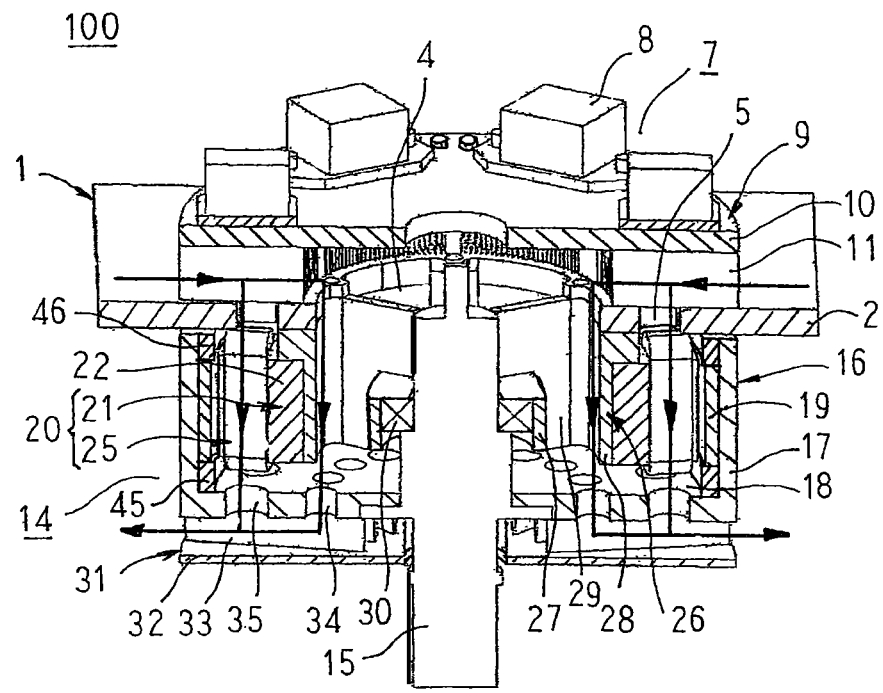
[FIG. 9] It is a cross-sectional perspective that explains a cooling airflow in the inverter-integrated driving module according to Embodiment 1 of the present invention.

FIG. 1 is an exploded perspective that shows an inverter-integrated driving module according to Embodiment 1 of the present invention, FIG. 2 is a cross-sectional perspective that shows the inverter-integrated driving module according to Embodiment 1 of the present invention, FIG. 3 is a cross section that shows a rotor that constitutes a motor that is used in the inverter-integrated driving module according to Embodiment 1 of the present invention, FIG. 4 is a perspective that shows a stator supporting member that constitutes a motor that is used in the inverter-integrated driving module according to Embodiment 1 of the present invention, FIG. 5 is a front elevation of a state in which the stator supporting member of the inverter-integrated driving module according to Embodiment 1 of the present invention is mounted to a bracket viewed from a side near a first surface of the bracket, FIG. 6 is a diagram that explains a radial positional relationship between a stator and the bracket in the inverter-integrated driving module according to Embodiment 1 of the present invention, FIG. 7 is a rear elevation that shows a heatsink that constitutes an inverter module that is used in the inverter-integrated driving module according to Embodiment 1 of the present invention, FIG. 8 is a partial cross section that explains an electrical connecting method between an inverter unit and a stator coil in the inverter-integrated driving module according to Embodiment 1 of the present invention, and FIG. 9 is a cross-sectional perspective that explains a cooling airflow in the inverter-integrated driving module according to Embodiment 1 of the present invention.

In FIGS. 1 and 2, an inverter-integrated driving module 100 includes: a bracket 1; an inverter module 7 that is mounted to a first surface of the bracket 1, and that converts direct-current power that is supplied from an external direct-current power supply (not shown) into alternating-current power; and a motor 14 that is mounted to a second surface of the bracket 1 so as to face the inverter module 7, and that is driven to rotate by supplying thereto the alternating-current power that is converted by the inverter module 7.

The bracket 1 is formed by bending a steel sheet into an L shape, for example, and has: a tabular mount portion 2 that supports the inverter module 7 and the motor 14; and a mounting arm 3 for mounting the inverter-integrated driving module 100 on a mount (not shown). First inverter ventilation apertures 4 that constitute a ventilation channel that cools a bearing 30 are disposed so as to pass through the mount portion 2. In addition, eighteen second inverter ventilation apertures 5 that constitute a ventilation channel that cools a stator coil 25 are disposed so as to pass through the mount portion 2 at a uniform angular pitch on a circumference of a common circle that is centered around an aperture center of the first inverter ventilation apertures 4. Here, the first inverter ventilation apertures 4 are formed so as to have an inside diameter that is equal to that of a stator supporting portion 28 of a stator supporting member 26 that is described below. The second inverter ventilation apertures 5 are formed so as to face respective slot portions 24 that are defined by tooth portions 23 that are adjacent to a stator yoke portion 22 that is described below. Heatsink mounting threaded apertures 43 are formed on the mount portion 2 as shown in FIG. 5.

The inverter module 7 has: six, for example, inverter units 8; and a heatsink 9 that is made of aluminum, copper, etc. The inverter units 8 are configured by sealing an upper arm switching element and a lower arm switching element in an insulating resin, for example. The heatsink 9 has: a tabular ring-shaped fin base 10 that has a penetrating aperture 10a; and a large number of radiating fins 11 that are disposed so as to stand on a rear surface of the fin base 10 so as to have respective directions of extension in radial directions, and that are arranged in a row in a radial pattern at a uniform angular pitch.

The six inverter units 8 are mounted onto a front surface of the fin base 10 so as to correspond to a region where the radiating fins 11 are disposed so as to be arranged at a uniform angular pitch on a circumference of a common circle that is centered around an aperture center of the penetrating aperture 10*a*. Moreover, radial positions of the inverter units 8 that are mounted onto the front surface of the fin base 10 align approximately with radial positions of the slot portions 24. As shown in FIG. 7, spacers 12 that are equal in height to the radiating fins 11 are disposed so as to project into spaces on a rear surface of the fin base 10 that are formed by thinning out groups of the radiating fins 11 that are positioned between the inverter units 8. The heatsink mounting passage apertures 10*b* are formed so as to pass through the fin base 10 and the spacers 12, and passage apertures 10*c* for passing wiring through are formed so as to pass through the fin base 10.

Moreover, the spacers 12 are not limited to being equal in height to the radiating fins 11, and may also be formed higher than the radiating fins 11. The number of spacers 12 is also not limited to six, provided that the heatsink 9 can be mounted stably onto the first surface of the mount portion 2 of the bracket 1. In addition, it is not necessary for all of the spacers 12 to be identical in shape.

The motor 14 includes: a rotor 16 that is formed by press-molding a magnetic material such as iron, for example, into a floored cylindrical shape that has: a cylindrical rotor yoke portion 17; and a bottom surface portion 18 that extends inward from a first axial end of the rotor yoke portion 17, the bottom surface portion 18 being fixed to a shaft 15 at a central axial position of the rotor yoke portion 17; permanent magnets 19 that are fixed to an inner circumferential surface of the rotor yoke portion 17 to constitute magnetic poles; a stator 20 that has: a stator core 21 that is formed, for example, by laminating magnetic steel sheets, and that has: a stator yoke portion 22 that is formed into a cylindrical shape; and eighteen tooth portions 23 that are each disposed so as to project radially outward from an outer circumferential surface of the stator yoke portion 22, and that are arranged at a uniform angular pitch circumferentially; and a stator coil 25 that is wound onto the tooth portions 23; a stator supporting member 26 that supports the stator 20, and that also supports the shaft 15 rotatably; and a centrifugal fan 31 that is mounted to an outer circumferential surface of the bottom surface portion 18 of the rotor 16.

On the bottom surface portion 18 of the rotor 16, as shown in FIG. 3, eighteen first rotor ventilation apertures 34 that constitute the ventilation channel that cools the bearing 30 are disposed so as to pass through at a uniform angular pitch on a circumference of a common circle that is centered around a central axis of the rotor yoke portion 17, and eighteen second rotor ventilation apertures 35 that constitute the ventilation channel that cools the stator coil 25 are disposed so as to pass through at a uniform angular pitch on a circumference of a common circle that is centered around the central axis of the rotor yoke portion 17. Here, the first rotor ventilation apertures 34 are formed so as to be positioned between a bearing box 27 and the stator supporting portion 28 in a radial direction. The second rotor ventilation apertures 35 are formed in positional relationships that radially face the slot portions 24 that are defined by the stator yoke portion 22 and the adjacent tooth portions 23.

The permanent magnets 19 are sintered rare-earth magnets, for example. A ring-shaped spacer 45 that is made of a nonmagnetic material such as a stainless alloy is fitted into the rotor yoke portion 17 so as to contact an inner circumferential surface of the bottom surface portion 18. Thus, sixteen permanent magnets 19 are arranged in a row so as to be in contact with the spacer 45 at a uniform angular pitch circumferentially such that North-seeking (N) poles and South-seeking (S) poles alternate, and are fixed to the inner circumferential surface of the rotor yoke portion 17 by adhesive, etc. In addition, a ring-shaped magnet brace 46 that is made of a nonmagnetic material such as a stainless alloy is press-fitted into the rotor yoke portion 17 so as to press the permanent magnets 19 toward the spacer 45, and is fixed to the rotor yoke portion 17 by welding if required. Axial positioning of the permanent magnets 19 is thereby achieved, and dislodging of the permanent magnets 19 is prevented. Leakage of magnetic flux from axial end surfaces of the permanent magnets 19 is also suppressed.

As shown in FIG. 4, the stator supporting member 26 includes the cylindrical bearing box 27, the cylindrical stator supporting portion 28, and six radial ribs 29 that extend axially in a radial pattern from the outer circumferential surface of the bearing box 27 at a uniform angular pitch circumferentially to link the bearing box 27 and the stator supporting portion 28.

The centrifugal fan 31 has: a base portion 32 that is formed into a flat ring shape; and blades 33 that are disposed so as to line up circumferentially on a first surface of the base portion 32. The centrifugal fan 31 is fixed to the rotor 16 such that the first surface of the base portion 32 faces toward the outer circumferential surface of the bottom surface portion 18 so as to ensure a predetermined clearance from the bottom surface portion 18.

Moreover, the rotor 16 is formed by press-molding a magnetic material such as iron, for example, but it is not absolutely necessary for the bottom surface portion 18 to be a magnetic body. Specifically, it is sufficient that at least the rotor yoke portion 17 of the rotor 16 be formed using a magnetic material.

The permanent magnets 19 are glued to the inner circumferential surface of the rotor yoke portion 17, but if the bonding strength between the permanent magnets 19 and the rotor yoke portion 17 is sufficient, the spacer 45 and the magnet brace 46 may also be omitted.

The permanent magnets 17 are mounted directly onto the inner circumferential surface of the rotor yoke portion 17, but a ring body that is formed using a magnetic material such as iron, and in which the sixteen permanent magnets 19 are embedded so as to be arranged at uniform angular pitch on a circumference of a common circle, may also be press-fitted inside the rotor yoke portion 17 so as to be held between the spacer 45 and the magnet brace 46.

Next, a method for assembling the inverter-integrated driving module 100 will be explained.

First, the stator supporting portion 28 is press-fitted so as to be fitted inside the stator yoke portion 22, and the stator 20 and the stator supporting member 26 are integrated by welding if required. Then, the bearing 30 is fitted into the bearing box 27. Next, the shaft 15 is press-fitted into a central axial position of the bottom surface portion 18 of the rotor 16 to which the centrifugal fan 31 has been fixed, and the rotor 16 and the shaft 15 are integrated by welding if required. Then, the motor 14 is formed by press-fitting the shaft 15 into the bearing 30, and mounting the rotor 16 onto the stator 20 such that the rotor yoke portion 17 covers an outer circumference of the stator 20. This motor 14 is an outer-rotor three-phase motor in which the number of poles is sixteen, and the number of slots is eighteen.

Next, the inverter module 7 is formed by mounting the six inverter units 8 onto the front surface of the fin base 10 so as to be arranged at a uniform angular pitch on the circumference of the common circle that is centered around the aperture center of the penetrating aperture 10a so as to correspond to the regions where the radiating fins 11 are disposed.

The motor 14 is then mounted to the second surface of the mount portion 2 of the bracket 1, as shown in FIG. 5, by aligning a central axis of the bearing box 27 with the aperture center of the first inverter ventilation apertures 4, and inserting screws 40 through the mount portion 2 and fastening them to threaded apertures 41 that are formed on the stator supporting member 26. At this point, a circumferential position of the stator supporting member 26 is adjusted such that the slot portions 24 face the second inverter ventilation apertures 5, as shown in FIG. 6.

In addition, the inverter module 7 is mounted onto the first surface of the mount portion 2 of the bracket 1 by aligning the aperture center of the penetrating aperture 10a of the fin base 10 with the aperture center of the first inverter ventilation aperture 4, and passing screws 42 through the passage apertures 10b and fastening them to the threaded apertures 43 that are formed on the first surface of the mount portion 2 of the bracket 1.

Next, the alternating-current output terminals of the inverter units 8 and the phase coils of the stator coil 25 are connected using wiring 36 to assemble the inverter-integrated driving module 100. As shown in FIG. 8, the wiring 36 is inserted into the passage apertures 10c that are opened on the heatsink 9 and is passed through between the radiating fins 11, and is then inserted into the second inverter ventilation apertures 5 that are disposed through the mount portion 2 of the bracket 1 to connect the alternating-current output terminals of the inverter units 8 and the phase coils of the stator coil 25.

In an inverter-integrated driving module 100 that is configured in this manner, ON/OFF switching of the upper arm switching elements and the lower arm switching elements of the inverter units 8 is controlled by a controlling apparatus (not shown) such that direct-current power that is supplied from an external electric power supply (not shown) is converted into alternating-current power and is supplied to the stator coil 25 by means of the wiring 36. A rotating magnetic field is thereby generated in the stator 20. Torque is generated by interaction between this rotating magnetic field of the stator 20 and the magnetic fields from the permanent magnets 19, driving the rotor 16 to rotate.

The centrifugal fan 31 is driven to rotate together with the rotor 16. As indicated by arrows in FIG. 9, a first cooling airflow ventilation pathway is formed such that a cooling airflow flows radially inward through the radiating fins 11 from radially outside the heatsink 9, then flows axially through the stator supporting portion 28 from the first inverter ventilation apertures 4, passes through the first rotor ventilation apertures 34 and flows out to an outer circumferential side of the bottom surface portion 18 of the rotor 16, and flows radially outward between the bottom surface portion 18 and the base portion 32 due to the rotation of this centrifugal fan 31. In addition, as indicated by the arrows in FIG. 9, a third cooling airflow ventilation channel is formed such that a portion of the cooling airflow that flows radially inward through the radiating fins 11 from radially outside the heatsink 9 flows toward the stator 20 through the second inverter ventilation apertures 5, flows axially through the slot portions 24, flows out to an outer circumferential side of the bottom surface portion 18 of the rotor 16 through the second rotor ventilation apertures 35, and flows radially outward between the bottom surface portion 18 and the base portion 32.

Thus, heat that is generated in the upper arm switching elements and the lower arm switching elements of the inverter units 8 is transferred to the radiating fins 11 by means of the fin base 10, and is radiated to the cooling airflow that flows through the radiating fins 11. A portion of the heat that is generated in the upper arm switching elements and the lower arm switching elements that is transferred to the radiating fins 11 is transferred to the mount portion 2 of the bracket 1, and is radiated from the surface of the bracket 1. Heat that is generated in the bearing 30 passes through the stator supporting portion 28 and is radiated to the cooling airflow that flows axially. In addition, heat that is generated in the stator coil 25 is radiated to the cooling airflow that flows axially through the slot portions 24. Furthermore, heat that is generated in the wiring 36 is radiated to the cooling airflow that flows through the radiating fins 11, and to the cooling airflow that flows through the second inverter ventilation apertures 5.

According to Embodiment 1, a first cooling airflow ventilation pathway is formed such that a cooling airflow flows radially inward through the radiating fins 11 from radially outside the heatsink 9, then flows axially through the stator supporting portion 28 from the first inverter ventilation apertures 4, passes through the first rotor ventilation apertures 34 and flows out to an outer circumferential side of the bottom surface portion 18 of the rotor 16, and flows radially outward between the bottom surface portion 18 and the base portion 32 when the centrifugal fan 31 is driven to rotate. Thus, the inverter units 8 and the bearing 30 are cooled by the cooling airflow that flows through the first cooling airflow ventilation channel. Because the radiating fins 11 contact the mount portion 2 of the bracket 1, a portion of the heat that is generated in the inverter units 8 is transferred to the mount portion 2 by means of the radiating fins 11, and is radiated from the surface of the bracket 1.

Thus, although the inverter-integrated driving module 100 uses an outer rotor, extension of service life of the inverter units 8 and the bearing 30 can be achieved because excessive temperature increases in the inverter units 8 and the bearing 30 are suppressed.

A third cooling airflow ventilation channel is formed such that a portion of the cooling airflow that flows radially inward through the radiating fins 11 from radially outside the heatsink 9 flows toward the stator 20 through the second inverter ventilation apertures 5, flows axially through the slot portions 24, flows out to an outer circumferential side of the bottom surface portion 18 of the rotor 16 through the second rotor ventilation apertures 35, and flows radially outward between the bottom surface portion 18 and the base portion 32. Thus, because excessive temperature increases in the stator coil 25 are suppressed, increases in loss that result from temperature increases are also suppressed, improving motor output characteristics.

Because the second inverter ventilation apertures 5 are disposed so as to pass through the mount portion 2 so as to face the respective slot portions 24 axially, the cooling airflow that passes through the second inverter ventilation apertures 5 from between the radiating fins 11 and flows in toward the stator 20 flows smoothly into the slot portions 24. Thus, ventilation resistance in the third cooling airflow ventilation channel is reduced, ensuring a sufficient flow rate of the cooling airflow that flows through the third cooling airflow ventilation channel.

Because the second rotor ventilation apertures 35 are disposed so as to pass through at radial positions that are even with the slot portions 24 of the bottom surface portion 18, the cooling airflow that has flowed axially through the slot portions 24 is discharged through the second rotor ventilation apertures 35 promptly. Thus, increases in ventilation resistance in the third cooling airflow ventilation channel are suppressed, ensuring the flow rate of the cooling airflow that flows through the third cooling airflow ventilation channel.

Because the wiring 36 is inserted into the passage apertures 10c that are opened on the fin base 10 of the heatsink 9 and is passed between the radiating fins 11, the heat that is generated in the wiring 36 is radiated to the cooling airflow that flows through the radiating fins 11, suppressing temperature increases in the wiring 36. Because the wiring 36 passes through the fin base 10 and the second inverter ventilation apertures 5 axially, wiring length can be shortened, enabling reductions in the resistance of the wiring 36.

Because the radial ribs 29 are formed into flat shapes that extend axially, the radial ribs 29 act as radiating fins, effectively cooling the stator 20 and the bearing 30.

Embodiment 2

Figure 10:
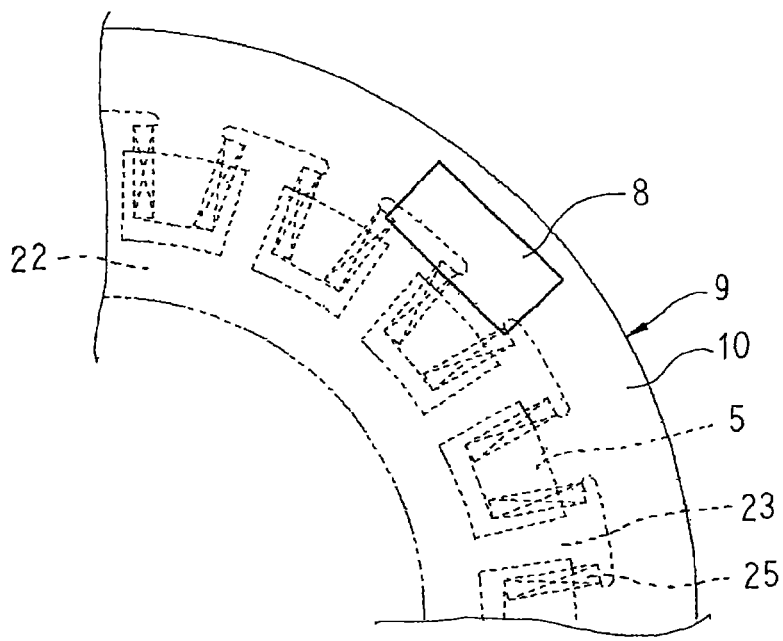
[FIG. 10] It is a diagram that explains a radial positional relationship between a stator and an inverter module in an inverter-integrated driving module according to Embodiment 2 of the present invention.

FIG. 10 is a diagram that explains a radial positional relationship between a stator and an inverter module in an inverter-integrated driving module according to Embodiment 2 of the present invention.

In FIG. 10, inverter units 8 are mounted to a front surface of a fin base 10 of a heatsink 9 so as to be positioned radially outside second inverter ventilation apertures 5.

Moreover, the rest of the configuration is formed in a similar or identical manner to that of Embodiment 1 above.

Consequently, similar or identical effects to those of Embodiment 1 above can also be achieved in Embodiment 2.

According to Embodiment 2, the inverter units 8 are mounted on the front surface of the fin base 10 so as to be positioned radially outside the second inverter ventilation apertures 5. Thus, because all of the cooling airflow that flows through the radiating fins 11 is supplied to cool the inverter units 8, the inverter units 8 can be cooled effectively.

Embodiment 3

Figure 11:
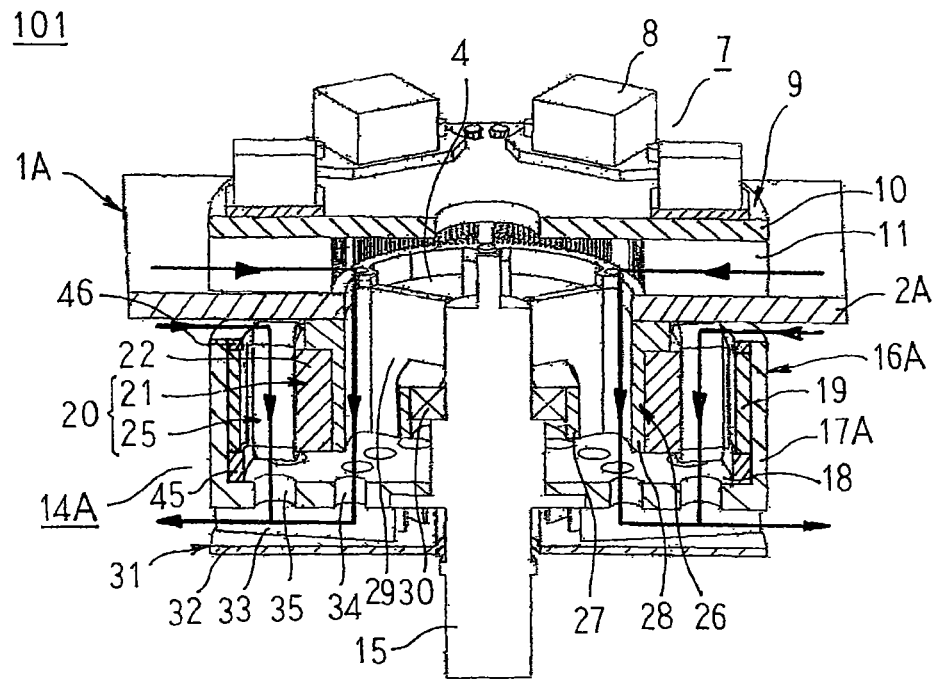
[FIG. 11] It is a cross-sectional perspective that explains a cooling airflow in an inverter-integrated driving module according to Embodiment 3 of the present invention.

FIG. 11 is a cross-sectional perspective that explains a cooling airflow in an inverter-integrated driving module according to Embodiment 3 of the present invention.

In FIG. 11, the second inverter ventilation apertures 5 on the mount portion 2 of the bracket 1 are omitted, and a passage aperture (not shown) for passage of wiring is disposed so as to pass through a mount portion 2A of a bracket 1A. An axial length of a rotor yoke portion 17A of a rotor 16A is formed so as to be shorter than an axial length of the rotor yoke portion 17 of the rotor 16.

Moreover, the rest of the configuration is formed in a similar or identical manner to that of Embodiment 1 above.

In an inverter-integrated driving module 101 according to Embodiment 3, because the axial length of the rotor yoke portion 17A is shortened, a gap is formed between the rotor yoke portion 17A and the mount portion 2A when a motor 14A is mounted onto a second surface of the mount portion 2A of the bracket 1A.

Thus, as indicated by arrows in FIG. 11, a first cooling airflow ventilation pathway is formed such that a cooling airflow flows radially inward through the radiating fins 11 from radially outside the heatsink 9, then flows axially through the stator supporting portion 28 from the first inverter ventilation apertures 4, passes through the first rotor ventilation apertures 34 and flows out to an outer circumferential side of the bottom surface portion 18 of the rotor 16A, and flows radially outward between the bottom surface portion 18 and the base portion 32 due to the rotation of the centrifugal fan 31. In addition, as indicated by arrows in FIG. 11, a second cooling airflow ventilation channel is formed such that a cooling airflow that flows radially inward through the gap between the rotor yoke portion 17A and the mount portion 2A from an outer circumferential side of the rotor 16A, then flows axially through the slot portions 24, flows out to an outer circumferential side of the bottom surface portion 18 of the rotor 16A through the second rotor ventilation apertures 35, and flows radially outward between the bottom surface portion 18 and the base portion 32.

According to Embodiment 3, because all of the cooling airflow that flows radially inward through the radiating fins 11 from radially outside the heatsink 9 is supplied to cool the bearing 30, the amount of cooling airflow that is supplied to cool the bearing 30 is increased, enabling the bearing 30 to be cooled effectively. Because the cooling airflow that is sucked in through the gap between the rotor yoke portion 17A and the mount portion 2A from the outer circumferential side of the rotor 16A is supplied to cool the stator coil 25, the temperature of the cooling airflow that is supplied to cool the stator coil 25 is lower, enabling the stator coil 25 to be cooled effectively.

Because it is not necessary to form the second inverter ventilation apertures 5 on the mount portion 2A, machining of the bracket 1A is facilitated.

Embodiment 4

Figure 12:
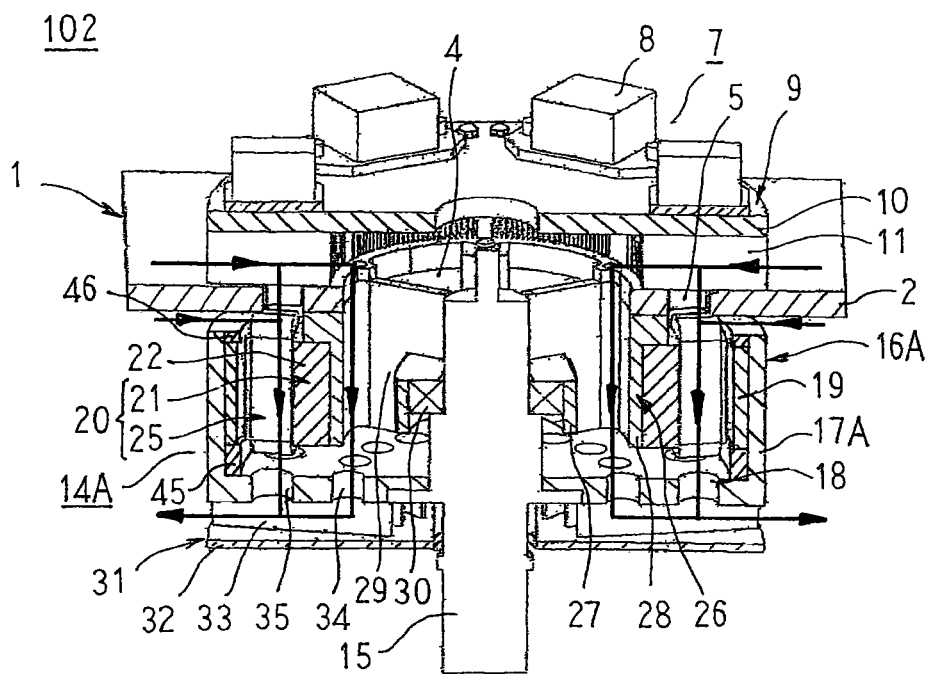
[FIG. 12] It is a cross-sectional perspective that explains a cooling airflow in an inverter-integrated driving module according to Embodiment 4 of the present invention.

FIG. 12 is a cross-sectional perspective that explains a cooling airflow in an inverter-integrated driving module according to Embodiment 4 of the present invention.

In FIG. 12, an axial length of a rotor yoke portion 17A of a rotor 16A is formed so as to be shorter than an axial length of the rotor yoke portion 17 of the rotor 16.

Moreover, the rest of the configuration is formed in a similar or identical manner to that of Embodiment 1 above.

In an inverter-integrated driving module 102 according to Embodiment 4, because the axial length of the rotor yoke portion 17A is shortened, a gap is formed between the rotor yoke portion 17A and the mount portion 2 when a motor 14A is mounted onto a second surface of the mount portion 2 of the bracket 1.

Thus, as indicated by arrows in FIG. 12, a first cooling airflow ventilation pathway is formed such that a cooling airflow flows radially inward through the radiating fins 11 from radially outside the heatsink 9, then flows axially through the stator supporting portion 28 from the first inverter ventilation apertures 4, passes through the first rotor ventilation apertures 34 and flows out to in outer circumferential side of the bottom surface portion 18 of the rotor 16A, and flows radially outward between the bottom surface portion 18 and the base portion 32 due to the rotation of the centrifugal fan 31. In addition, as indicated by arrows in FIG. 12, a cooling airflow ventilation channel is formed such that a cooling airflow that flows radially inward through the gap between the rotor yoke portion 17A and the mount portion 2 from an outer circumferential side of the rotor 16A merges with a cooling airflow that flows radially inward through the radiating fins 11 from radially outside the heatsink 9, and flows toward the stator 20 through the second inverter ventilation apertures 5, flows axially through the slot portions 24, flows out to an outer circumferential side of the bottom surface portion 18 of the rotor 16A through the second rotor ventilation apertures 35, and flows radially outward between the bottom surface portion 18 and the base portion 32.

According to Embodiment 4, because a cooling airflow that is sucked in through the gap between the rotor yoke portion 17A and the mount portion 2 from an outer circumferential side of the rotor 16A merges with a cooling airflow that flows radially inward through the radiating fins 11 from radially outside the heatsink 9, flows toward the stator 20 through the second inverter ventilation apertures 5, and is supplied to cool the stator coil 25, the amount of cooling airflow that is supplied to cool the stator coil 25 is increased, enabling the stator coil 25 to be cooled effectively.

Embodiment 5

Figure 13:
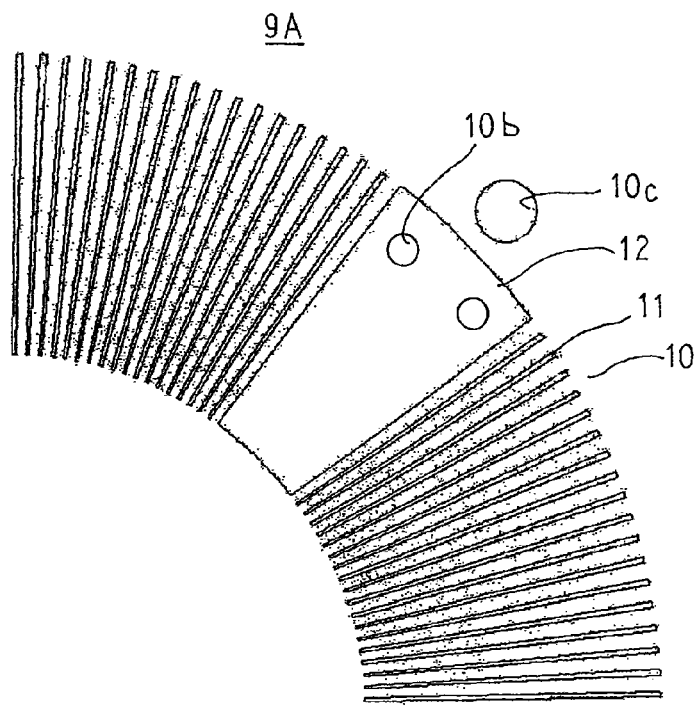
[FIG. 13] It is a partial rear elevation that shows a heatsink that is used in an inverter-integrated driving module according to Embodiment 5 of the present invention.

FIG. 13 is a partial rear elevation that shows a heatsink that is used in an inverter-integrated driving module according to Embodiment 5 of the present invention.

In FIG. 13, a passage aperture 10c for passage of wiring is disposed so as to pass through a position that is radially outside a spacer 12 of a fin base 10 of a heatsink 9A.

Moreover, the rest of the configuration is formed in a similar or identical manner to that of Embodiment 1 above.

According to Embodiment 5, because the passage aperture 10c for passage of wiring is disposed so as to pass through at a position that is radially outside the spacer 12 of the fin base 10, the wiring 36 extends axially through the passage aperture 10c, and is led out toward the motor 14 without passing between the radiating fins 11. Thus, because the cooling airflow flows through the radiating fins 11 without being obstructed by the wiring 36, the amount of cooling airflow that is supplied to cool the inverter units 8 and the bearing 30 is increased, enabling the inverter units 8 and the bearing 30 to be cooled effectively.

Embodiment 6

Figure 14:
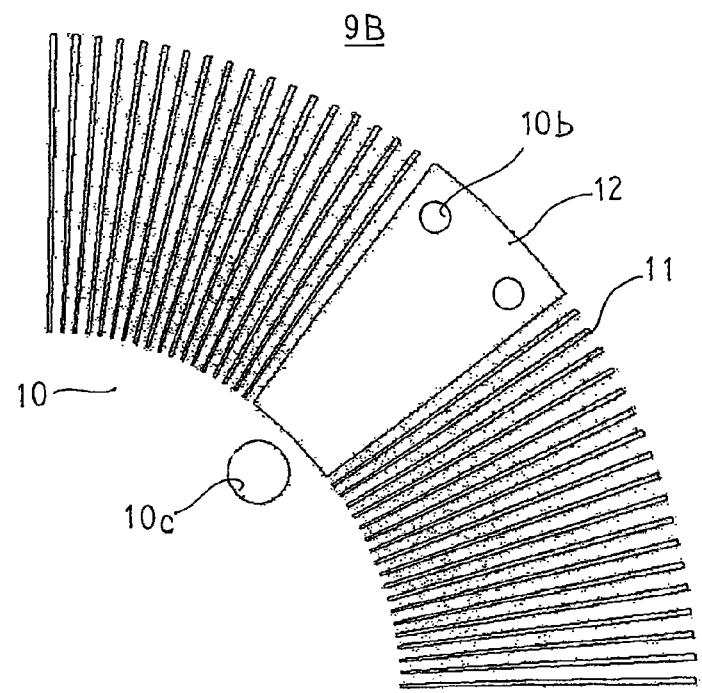
[FIG. 14] It is a partial rear elevation that shows a heatsink that is used in an inverter-integrated driving module according to Embodiment 6 of the present invention.

FIG. 14 is a partial rear elevation that shows a heatsink that is used in an inverter-integrated driving module according to Embodiment 6 of the present invention.

In FIG. 14, a passage aperture 10c for passage of wiring is disposed so as to pass through a position that is radially inside a spacer 12 of a fin base 10 of a heatsink 9B.

Moreover, the rest of the configuration is formed in a similar or identical manner to that of Embodiment 1 above.

According to Embodiment 6, because the passage aperture 10c for passage of wiring is disposed so as to pass through at a position that is radially inside the spacer 12 of the fin base 10, the wiring 36 extends axially through the passage aperture 10c, and is led out toward the motor 14 without passing between the radiating fins 11. Thus, because the cooling airflow flows through the radiating fins 11 without being obstructed by the wiring 36, the amount of cooling airflow that is supplied to cool the inverter units 8 and the bearing 30 is increased, enabling the inverter units 8 and the bearing 30 to be cooled effectively.

Embodiment 7

Figure 15:
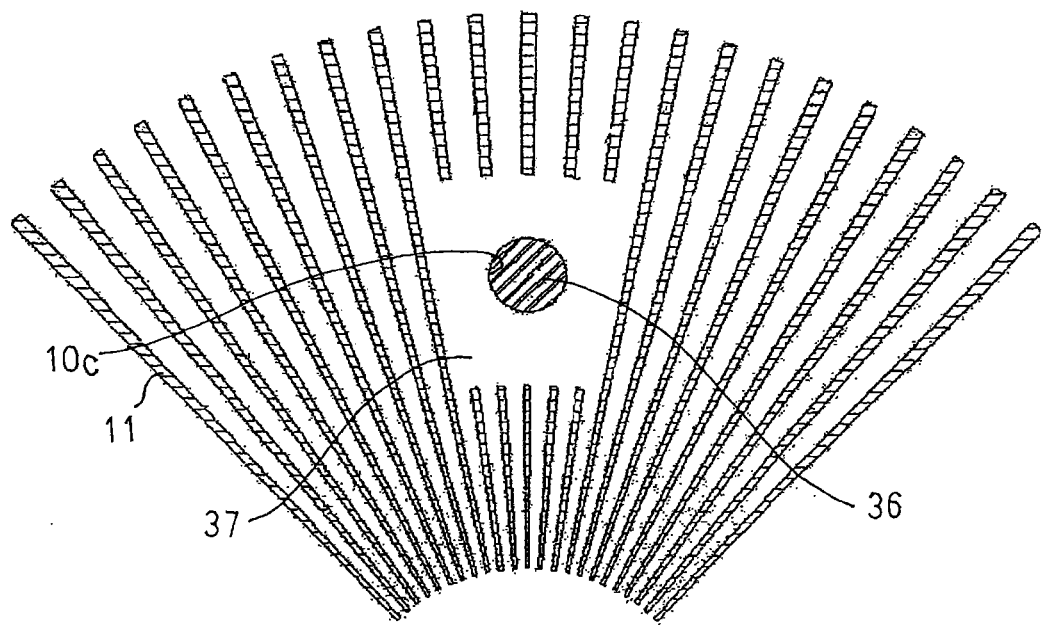
[FIG. 15] It is a partial rear elevation that shows a heatsink that is used in an inverter-integrated driving module according to Embodiment 7 of the present invention.

FIG. 15 is a partial rear elevation that shows a heatsink that is used in an inverter-integrated driving module according to Embodiment 7 of the present invention.

In FIG. 15, a predetermined region in a radial direction of a plurality of circumferentially adjacent radiating fins 11 is removed from a heatsink 9C, and a passage aperture 10c for passage of wiring is disposed so as to pass through the fin-removed space 37 of the radiating fins 11 of the fin base 10.

Moreover, the rest of the configuration is formed in a similar or identical manner to that of Embodiment 1 above.

According to Embodiment 7, because the passage aperture 10c is disposed so as to pass through the fin-removed space 37 of the fin base 10, increases in ventilation resistance to the cooling airflow that flows radially inward through the radiating fins 11 that result from passing the wiring 36 through the passage aperture 10c can be suppressed. Thus, the amount of cooling airflow that is supplied to cool the inverter units 8 and the bearing 30 can be ensured. In addition, the cooling airflow that is supplied to cool the wiring 36 is increased, enabling the wiring 36 to be cooled effectively.

Embodiment 8

Figure 16:
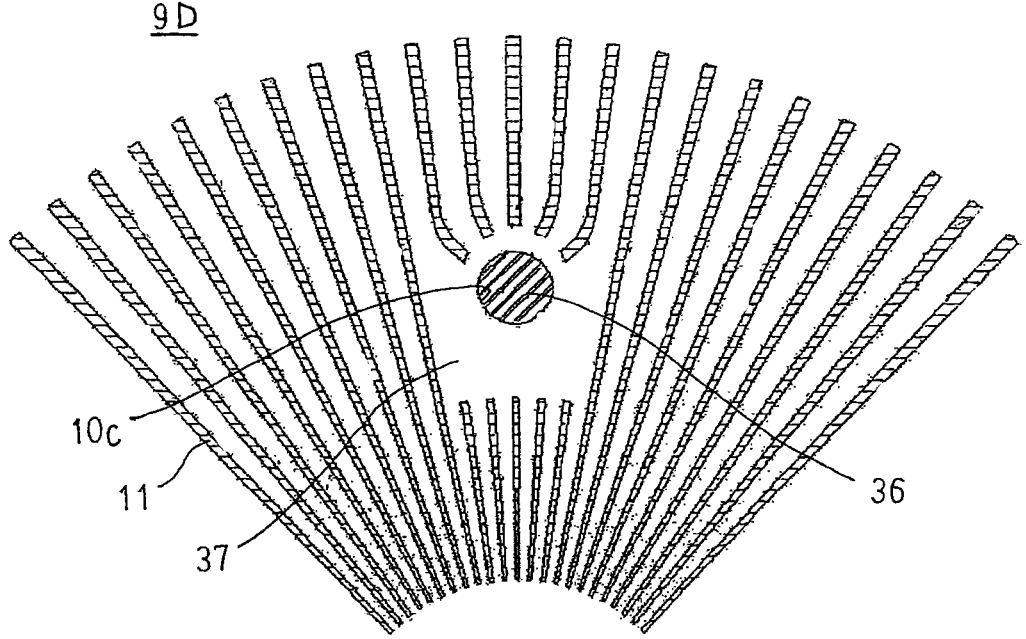
[FIG. 16] It is a partial rear elevation that shows a heatsink that is used in an inverter-integrated driving module according to Embodiment 8 of the present invention.

FIG. 16 is a partial rear elevation that shows a heatsink that is used in an inverter-integrated driving module according to Embodiment 8 of the present invention.

In FIG. 16, cut end portions of radiating fins 11 radially outside where a predetermined radial region is removed from a heatsink 9D are bent so as to be directed toward a passage aperture 10c.

Moreover, the rest of the configuration is formed in a similar or identical manner to that of Embodiment 7 above.

According to Embodiment 8, because the cut end portions of the radiating fins 11 radially outside where the predetermined radial region is removed are bent so as to be directed toward the passage aperture 10c, the cooling airflow flows radially inward through the radiating fins 11, and flows into the fin-removed space 37 from the cut end portions of the radiating fins 11 so as to be directed toward the passage aperture 10c. Thus, the cooling airflow that is supplied to cool the wiring 36 is increased, enabling the wiring 36 to be cooled more effectively.

Embodiment 9

Figure 17:
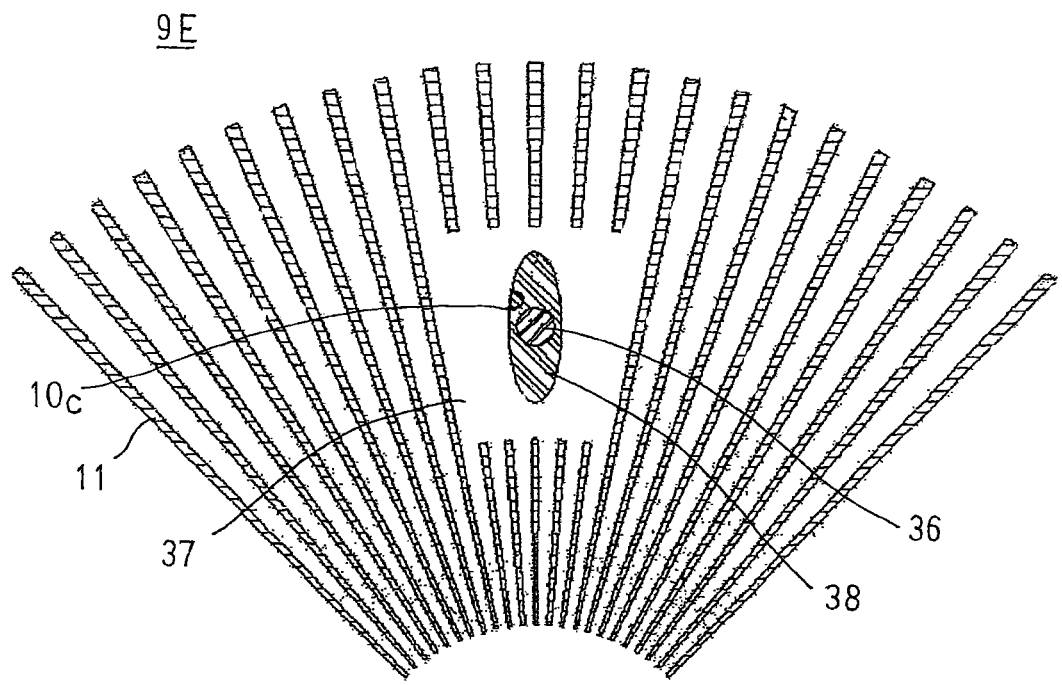
[FIG. 17] It is a partial rear elevation that shows a heatsink that is used in an inverter-integrated driving module according to Embodiment 9 of the present invention.

FIG. 17 is a partial rear elevation that shows a heatsink that is used in an inverter-integrated driving module according to Embodiment 9 of the present invention.

In FIG. 17, an insulating sheath 38 of wiring 36 is formed so as to have an elliptical cross section. A cross-sectional shape of a passage aperture 10c of a heatsink 9E is formed into an elliptical shape that conforms to the cross-sectional shape of the insulating sheath 38. The insulating sheath 38 of the wiring 36 that is inserted through the passage aperture 10c is disposed inside the fin-removed space 37 such that the longitudinal axis of the elliptical cross section is oriented radially.

Moreover, the rest of the configuration is formed in a similar or identical manner to that of Embodiment 7 above.

According to Embodiment 9, because the insulating sheath 38 of the elliptical cross section is disposed inside the fin-removed space 37 such that the longitudinal axis of its elliptical cross section is oriented radially, the cooling airflow that flows through the fin-removed space 37 of the radiating fins 11 is smoothed by the insulating sheath 38. Thus, because pressure loss due to the wiring 36 inside the fin-removed space 37 can be reduced, ensuring the amount of cooling airflow that flows through the radiating fins 11, reductions in the capacity to cool the inverter units 8 and the bearing 30 that result from the wiring 36 being inserted can be suppressed.

Moreover, in Embodiment 9 above, the insulating sheath 38 is formed so as to have an elliptical cross section, but the cross-sectional shape of the insulating sheath is not limited to an elliptical shape, and need only be a long, slender shape that forms a curve in which a minor axial width tapers gradually toward a major axial leading end and trailing end near the major axial leading end and trailing end.

Embodiment 10

Figure 18:
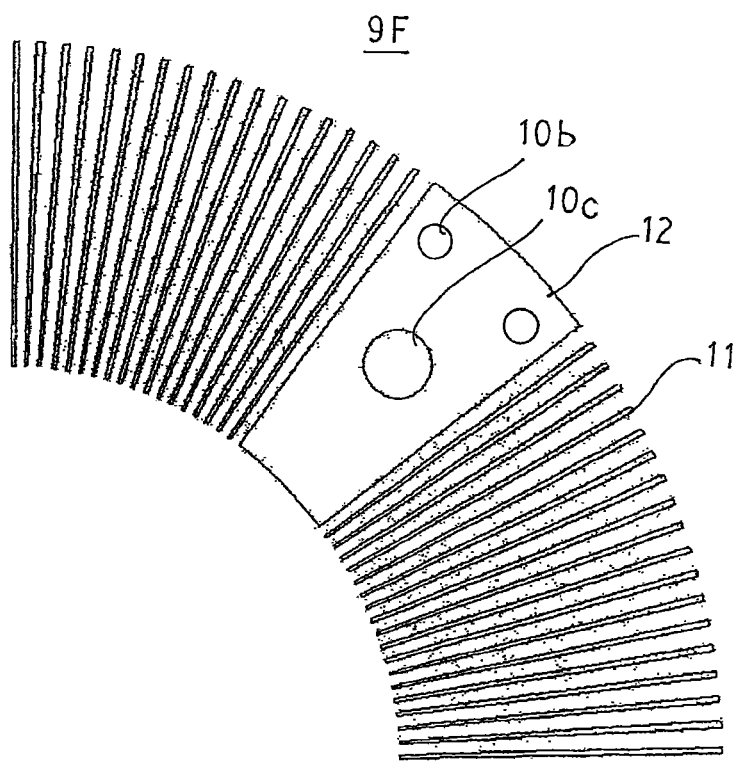
[FIG. 18] It is a partial rear elevation that shows a heatsink that is used in an inverter-integrated driving module according to Embodiment 10 of the present invention.

FIG. 18 is a partial rear elevation that shows a heatsink that is used in an inverter-integrated driving module according to Embodiment 10 of the present invention.

In FIG. 18, a passage aperture 10c for passage of wiring is disposed so as to pass through a spacer 12 of a heatsink 9F.

Moreover, the rest of the configuration is formed in a similar or identical manner to that of Embodiment 1 above.

According to Embodiment 10, because the passage aperture 10c is disposed so as to pass through the spacer 12, the cooling airflow can flow through the radiating fins 11 without being obstructed by the wiring 36, enabling the amount of cooling airflow that is supplied to cool the inverter units 8 and the bearing 30 to be ensured. In addition, heat that is generated in the wiring 36 that is passed through the passage aperture 10c is transferred to the radiating fins 11 by means of the spacer 12 and the fin base 10, and is radiated to the cooling airflow from the radiating fins 11.

Embodiment 11

Figure 19:
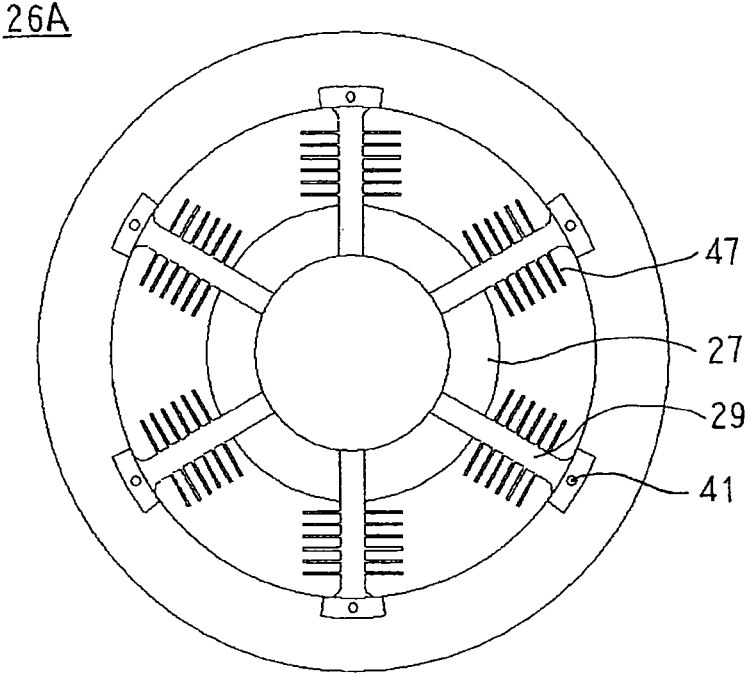
[FIG. 19] It is a front elevation that shows a stator supporting member that constitutes a motor that is used in an inverter-integrated driving module according to Embodiment 11 of the present invention.

FIG. 19 is a front elevation that shows a stator supporting member that constitutes a motor that is used in an inverter-integrated driving module according to Embodiment 11 of the present invention.

In FIG. 19, a plurality of flat, rectangular, thin tabular fins 47 are disposed so as to stand perpendicularly on two circumferential side surfaces of respective radial ribs 29 and extend axially.

Moreover, the rest of the configuration is formed in a similar or identical manner to that of Embodiment 1 above.

In a stator supporting member 26A that is configured in this manner, heat radiating area is increased by forming the thin tabular fins 47 on the respective radial ribs 29. Thus, heat that is generated by the stator coil 25 and heat that is generated by the bearing 30 is transferred to the stator supporting member 26A, and is radiated from the thin tabular fins 47 to the cooling airflow that flows through the stator supporting member 26A.

Consequently, according to Embodiment 11, excessive temperature increases in the stator coil 25 and the bearing 30 can be suppressed, enabling improvements in motor output characteristics and extension of service life of the bearing 30.

Embodiment 12

Figure 20:
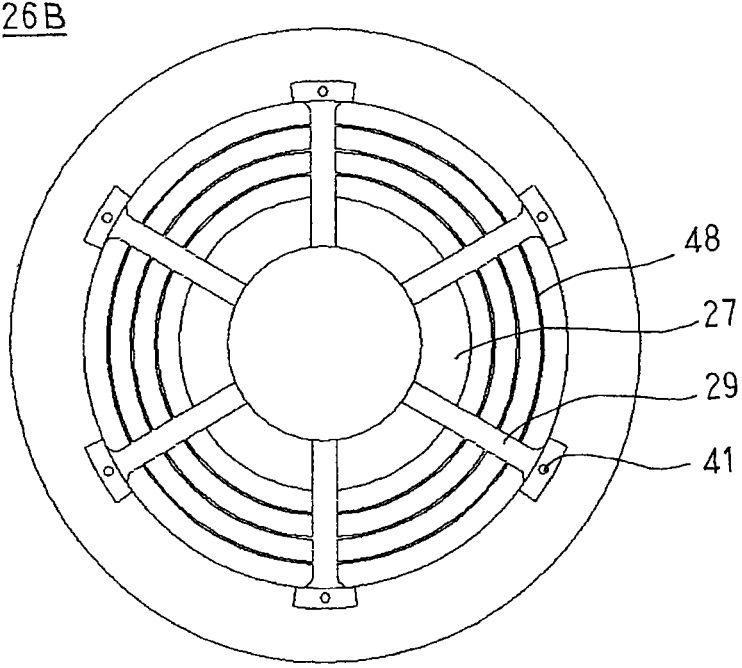
[FIG. 20] It is a front elevation that shows a stator supporting member that constitutes a motor that is used in an inverter-integrated driving module according to Embodiment 12 of the present invention.

FIG. 20 is a front elevation that shows a stator supporting member that constitutes a motor that is used in an inverter-integrated driving module according to Embodiment 12 of the present invention.

In FIG. 20, a plurality of strip-shaped thin tabular fins 48 that have circular arc-shaped cross sections are disposed so as to link respective pairs of circumferentially adjacent radial ribs 29 and extend axially. Three cylinders that are constituted by the thin tabular fins 48 are thereby formed concentrically when viewed from an axial direction.

Moreover, the rest of the configuration is formed in a similar or identical manner to that of Embodiment 1 above.

In a stator supporting member 26B that is configured in this manner, heat radiating area is increased by forming the strip-shaped thin tabular fins 48 that have circular arc-shaped cross sections so as to link circumferentially adjacent respective radial ribs 29. Thus, heat that is generated by the stator coil 25 and heat that is generated by the bearing 30 is transferred to the stator supporting member 26B, and is radiated from the thin tabular fins 48 to the cooling airflow that flows through the stator supporting member 26B.

Consequently, in Embodiment 12, excessive temperature increases in the stator coil 25 and the bearing 30 can also be suppressed, enabling improvements in motor output characteristics and extension of service life of the bearing 30.

Now, in Embodiments 1 through 12 above, a centrifugal fan 31 is used, but the fan is not limited to a centrifugal fan 31, provided that it is disposed so as to face the outer circumferential surface of the bottom surface portion 18 of the rotor 16 or 16A and operates so as to discharge a cooling airflow from inside the stator supporting portion 26, 26A, or 26B or inside the slot portions 24, and may also be an axial flow fan, for example.

Embodiment 13

Figure 21:
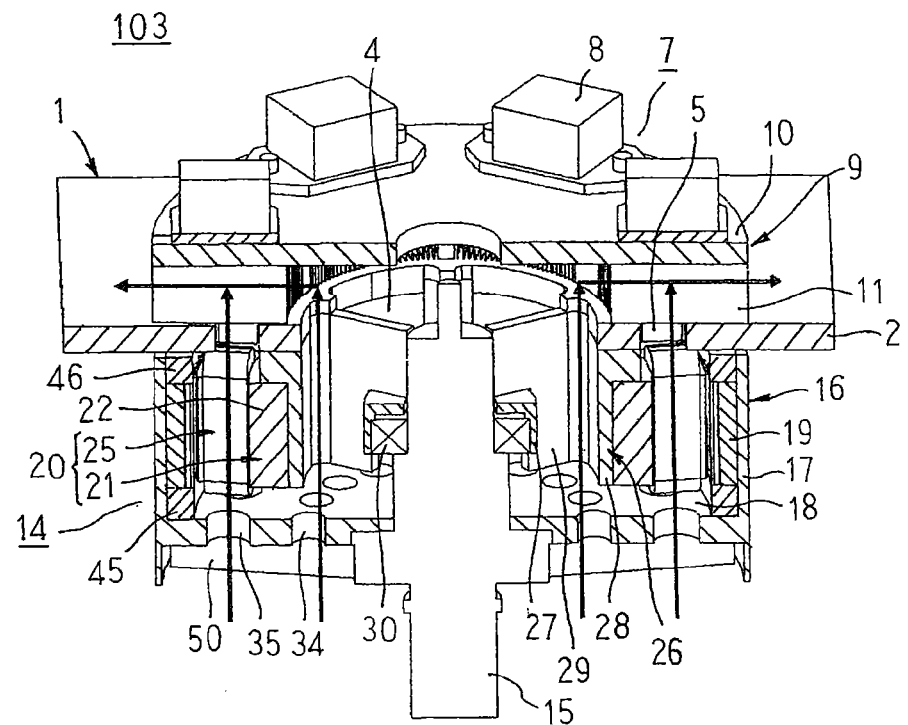
[FIG. 21] It is a cross-sectional perspective that shows an inverter-integrated driving module according to Embodiment 13 of the present invention.

FIG. 21 is a cross-sectional perspective that shows an inverter-integrated driving module according to Embodiment 13 of the present invention.

In FIG. 21, an axial flow fan 50 is fixed to a portion of a shaft 15 that projects from a bottom surface portion 18 of a rotor 16 and is disposed so as to face an outer circumferential surface of the bottom surface portion 18. This axial flow fan 50 is configured so as to be driven to rotate together with the shaft 15 to convey a cooling airflow into a stator supporting portion 38 through first rotor ventilation apertures 34, and also to convey a cooling airflow into slot portions 24 through second rotor ventilation apertures 35.

Moreover, Embodiment 13 is configured in a similar or identical manner to that of Embodiment 1 above except that the axial flow fan 50 is used instead of the centrifugal fan 31.

In an inverter-integrated driving module 103 that is configured in this manner, as indicated by arrows in FIG. 21, a first cooling airflow ventilation pathway is formed such that a cooling airflow is blown into the stator supporting portion 38 through the first rotor ventilation apertures 34, flows axially through the stator supporting portion 38, then flows radially inside the radiating fins 11 through the first inverter ventilation apertures 4, flows radially outward through the radiating fins 11 from radially inside, and flows out radially outside the heatsink 9 due to the rotation of the axial flow fan 50. In addition, a third cooling airflow ventilation channel is configured such that a cooling airflow is blown into the slot portions 24 through the second rotor ventilation apertures 35, flows axially through the slot portions 24, and then enters the radiating fins 11 through the second inverter ventilation apertures 5, and merges with the cooling airflow that flows radially outward through the radiating fins 11 from radially inside.

According to Embodiment 13, unlike Embodiment 1 above, because a cooling airflow is supplied to cool the bearing 30 and the stator coil 25 before being supplied to cool the inverter units 8, the bearing 30 and the stator coil 25 are cooled effectively. Thus, if inverter units are used that are formed using highly heat-resistant semiconductor elements such as silicon carbide (SiC), adopting the present configuration is effective because the heat tolerance threshold of the bearing 30 and the stator coil 25 is lower than the inverter units.

Embodiment 14

Figure 22:
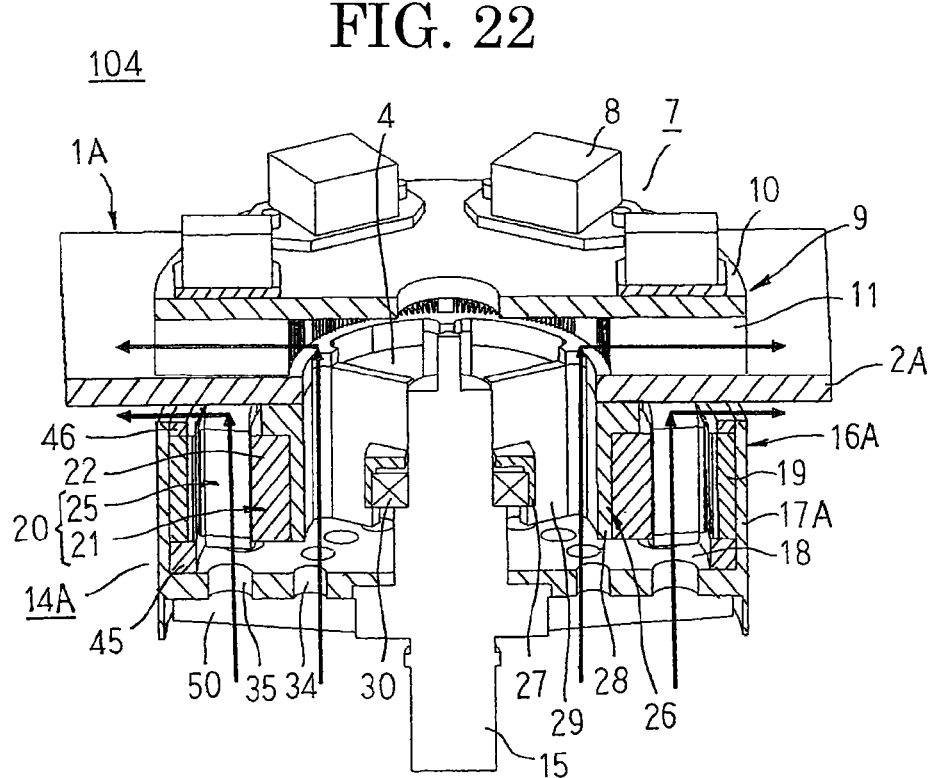
[FIG. 22] It is a cross-sectional perspective that shows an inverter-integrated driving module according to Embodiment 14 of the present invention.

FIG. 22 is a cross-sectional perspective that shows an inverter-integrated driving module according to Embodiment 14 of the present invention.

In FIG. 22, an axial flow fan 50 is fixed to a portion of a shaft 15 that projects from a bottom surface portion 18 of a rotor 16 and is disposed so as to face an outer circumferential surface of the bottom surface portion 18.

Moreover, Embodiment 14 is configured in a similar or identical manner to that of Embodiment 3 above except that the axial flow fan 50 is used instead of the centrifugal fan 31.

In an inverter-integrated driving module 104 that is configured in this manner, as indicated by arrows in FIG. 22, a first cooling airflow ventilation pathway is formed such that a cooling airflow is blown into the stator supporting portion 38 through the first rotor ventilation apertures 34, flows axially through the stator supporting portion 38, then flows radially inside the radiating fins 11 through the first inverter ventilation apertures 4, flows radially outward through the radiating fins 11 from radially inside, and flows out radially outside the heatsink 9 due to the rotation of the axial flow fan 50. In addition, a third cooling airflow ventilation channel is configured such that a cooling airflow is blown into the slot portions 24 through the second rotor ventilation apertures 35, flows axially through the slot portions 24, and then passes through the gap between the rotor yoke portion 17A and the mount portion 2A from the outer circumferential side of the rotor 16A, and flows outward to an outer circumferential side of the rotor 16A.

According to Embodiment 14, unlike Embodiment 3 above, because a cooling airflow is supplied to cool the bearing 30 before being supplied to cool the inverter units 8, the bearing 30 is cooled effectively. Thus, if inverter units are used that are formed using highly heat-resistant semiconductor elements such as silicon carbide (SiC), adopting the present configuration is effective because the heat tolerance threshold of the bearing 30 is lower than the inverter units.

Now, in Embodiments 13 and 14, the axial flow fan 50 is used instead of the centrifugal fan 31 in Embodiments 1 and 3, but it goes without saying that the axial flow fan 50 may also be used instead of the centrifugal fan 31 in the other embodiments.

If the axial flow fan 50 is used instead of the centrifugal fan 31 in Embodiment 8 above, it is preferable for end portions of the radiating fins 11 near the region of removal that are positioned radially inside the fin-removed space 37 to be bent so as to be directed toward the passage aperture 10c from the viewpoint of cooling the wiring 36.

In Embodiments 13 and 14 above, an axial flow fan 50 is used, but the fan is not limited to an axial flow fan 50, provided that it is disposed so as to face the outer circumferential surface of the bottom surface portion 18 of the rotor 16 or 16A and operates so as to make a cooling airflow flow into the stator supporting portion 26, 26A, or 26B or inside the slot portions 24, and may also be a mixed flow fan, for example.

Moreover, in each of the above embodiments, the stator core and the stator supporting member are configured into separate parts, but the stator core and the stator supporting member may also be configured as a single part.

In each of the above embodiments, the stator supporting member has six radial ribs, but the number of radial ribs may also be increased. The heat radiating area of the radial ribs is thereby increased, and heat that is generated in the stator coil and the bearing is radiated to the cooling airflow that flows through the stator supporting portion, enabling temperature increases in the stator and the bearing to be suppressed. In that case, increases in ventilation resistance inside the stator supporting portion that result from increasing the number of radial ribs can be suppressed if the cross-sectional area of the respective radial ribs is reduced.

In Embodiments 1, 2, 4 through 9, 13, and 14 above, wiring is passed through second inverter ventilation apertures that are disposed so as to pass through the mount portion of the bracket in order to let the cooling airflow flow to the slot portions, but an aperture specifically for passage of the wiring may also be formed on the mount portion of the bracket separately.

In each of the above embodiments, the inverter unit is constituted by single upper arm switching elements and single lower arm switching elements, but an inverter unit may also be constituted by a plurality of upper arm switching elements that are connected to each other in parallel and a plurality of lower arm switching elements that are connected to each other in parallel.

In each of the above embodiments, six inverter units are used, but the number of inverter units is not limited thereto, and can be set to match the connection configuration of the stator coil as required. If the stator coil is configured into a single three-phase alternating-current winding, for example, the number of inverter units will be three.

In each of the above embodiments, spacers are formed integrally on the fin base of the heatsink, but a spacer may also be formed as a separate part from the fin base.

In each of the above embodiments, the second inverter ventilation apertures are disposed through the mount portion so as to face each of the slot portions axially, but it is not absolutely necessary to dispose second inverter ventilation apertures so as to face all of the slot portions axially, and the number of second inverter ventilation apertures should be set so as to allow for the degree of temperature increases in the stator coil as required.

The Invention claimed is:

1. An inverter-integrated driving module comprising:
a motor comprising:
   a stator comprising:
     an annular stator core in which slot portions are arranged in a row circumferentially so as to have openings on an outer circumferential side; and
     a stator coil that is mounted onto said stator core;
   a bearing box that is held by said stator core at a central axial position of said stator core by means of radial ribs;
   a rotor comprising:
     a cylindrical rotor yoke portion;
     a bottom surface portion that is disposed so as to extend radially inward from a first end of said rotor yoke portion; and
     a plurality of magnetic poles that are disposed on an inner circumferential surface of said rotor yoke portion such that North-seeking (N) poles and South-seeking (S) poles are arranged in a row so as to alternate circumferentially,
   wherein said bottom surface portion is fixed to a shaft that is supported by a bearing that is housed in said bearing box, and said rotor yoke portion is mounted so as to be coaxial with said stator so as to envelop said stator core;
a fan that is disposed on a first axial end of said rotor so as to face said bottom surface portion so as to be able to rotate together with said rotor; and
an inverter module comprising:
   a heatsink comprising:
     a tabular fin base; and
     a plurality of radiating fins that are each disposed so as to stand perpendicularly on a rear surface of said fin base so as to extend radially and that are arranged in a row circumferentially; and
   a plurality of inverter units that are each mounted so as to be positioned on a region of a front surface of said fin base that corresponds to where said radiating fins are disposed, said plurality of inverter units supplying alternating-current power to said stator coil, wherein:
said motor is mounted to a bracket by fixing said stator core to a first surface of a tabular mount portion of said bracket;
said inverter module is mounted to said bracket such that said radiating fins face toward a second surface of said mount portion by fixing said fin base to said mount portion by means of a spacer;
a first inverter ventilation aperture is disposed so as to pass through a portion of said bracket that faces said bearing;
a first rotor ventilation aperture is disposed so as to pass through a portion of said bottom surface portion that faces said bearing; and
a first cooling airflow ventilation channel is formed that comprises:
   a radial ventilation channel that is formed between adjacent radiating fins so as to communicate between said first inverter ventilation aperture and a radially outer side of said heatsink, and through which a cooling airflow flows radially due to rotational driving of said fan; and an axial ventilation channel that is formed inside said stator core so as to communicate between said first inverter ventilation aperture and said first rotor ventilation aperture, and through which said cooling airflow flows axially.

2. An inverter-integrated driving module according to claim 1, wherein:
a second rotor ventilation aperture is disposed so as to pass through a portion of said bottom surface portion that faces said stator core; and
a second cooling airflow ventilation channel is formed inside said slot portions that functions together with an air gap between said rotor yoke portion and said mount portion to communicate between a radially outer side of said rotor yoke portion and said second rotor ventilation aperture, and through which said cooling airflow flows axially due to rotational driving of said fan.

3. An inverter-integrated driving module according to claim 1, wherein:
a second inverter ventilation aperture is disposed so as to pass through a portion of said mount portion that faces said stator core;
a second rotor ventilation aperture is disposed so as to pass through a portion of said bottom surface portion that faces said stator core; and
a third cooling airflow ventilation channel is formed inside said slot portions that functions together with said second inverter ventilation aperture to communicate between said radial ventilation channel and said second rotor ventilation aperture, and through which said cooling airflow flows axially due to rotational driving of said fan.

4. An inverter-integrated driving module according to claim 3, wherein said second inverter ventilation aperture is disposed so as to pass through said mount portion so as to face said slot portions axially.

5. An inverter-integrated driving module according to claim 4, wherein said second inverter ventilation aperture is disposed so as to pass through said mount portion so as to face each of said slot portions axially.

6. An inverter-integrated driving module according to claim 3, wherein said inverter units are mounted radially onto said front surface of said fin base so as to be positioned radially outside said second inverter ventilation aperture.

7. An inverter-integrated driving module according to claim 1, wherein a plurality of thin tabular fins are formed on said radial ribs so as to extend axially.

8. An inverter-integrated driving module according to claim 1, wherein wiring that connects said inverter unit and said stator coil passes through said fin base and said mount portion.

9. An inverter-integrated driving module according to claim 8, wherein said wiring passes through said fin base so as to pass through a fin-removed space that is formed by removing a radial portion of a circumferentially adjacent plurality of said radiating fins.

10. An inverter-integrated driving module according to claim 9, wherein an end portion of said radiating fins that is positioned on a radially outer side or a radially inner side of said fin-removed space is bent such that a cooling airflow that flows into said fin-removed space from between said radiating fins is directed toward said wiring that passes through said fin-removed space.

11. An inverter-integrated driving module according to claim 9, wherein a cross-sectional shape of an insulating sheath of said wiring is a long, slender shape that has a longitudinal axis in a radial direction, and that forms a curve in which a minor axial width narrows gradually toward a major axial leading end and trailing end near said major axial leading end and trailing end.

12. An inverter-integrated driving module according to claim 8, wherein said wiring passes through said fin base so as to be passed through said spacer.

* * * * *